(12) United States Patent
Kim et al.

(10) Patent No.: US 7,986,377 B2
(45) Date of Patent: Jul. 26, 2011

(54) LCD PANEL ARRAY SUBSTRATES

(75) Inventors: Dong-Gyu Kim, Gyeonggi-do (KR);
Seung-Soo Baek, Seoul (KR)

(73) Assignee: Samsung Electronics Co., Ltd. (KR)

( * ) Notice: Subject to any disclaimer, the term of this patent is extended or adjusted under 35 U.S.C. 154(b) by 1031 days.

(21) Appl. No.: 11/823,372

(22) Filed: Jun. 26, 2007

(65) Prior Publication Data

US 2008/0001877 A1    Jan. 3, 2008

(30) Foreign Application Priority Data

Jun. 30, 2006  (KR) .................. 10-2006-0060413

(51) Int. Cl.
*G02F 1/1343*  (2006.01)

(52) U.S. Cl. ........................................ 349/38; 349/139
(58) Field of Classification Search .............. 349/38–39, 349/139, 143
See application file for complete search history.

(56) References Cited

U.S. PATENT DOCUMENTS

| 5,245,450 | A |   | 9/1993 | Ukai et al. |
| 5,943,106 | A | * | 8/1999 | Sukenori et al. ................ 349/39 |
| 6,004,831 | A |   | 12/1999 | Yamazaki et al. |
| 2010/0026921 | A1 | * | 2/2010 | Tsubata .......................... 349/37 |

FOREIGN PATENT DOCUMENTS

| JP | 60 207116 | 10/1985 |
| JP | 01 277217 | 11/1989 |
| JP | 06 308533 | 12/1999 |
| JP | 2003-255371 | 9/2003 |

OTHER PUBLICATIONS

Examination Report for corresponding European Patent Application No. 07012341.8 dated Feb. 23, 2010.

* cited by examiner

*Primary Examiner* — Dung T. Nguyen
(74) *Attorney, Agent, or Firm* — Innovation Counsel LLP

(57) ABSTRACT

An LCD array substrate includes a gate line, a data line, a thin film transistor, a pixel electrode and a storage line. The pixel electrode is formed in a unit pixel defined by the gate line and the data line and is electrically connected to the thin film transistor. The storage line includes a main storage line, a first sub storage line and a second sub storage line. The first sub storage line overlaps a first edge portion of the pixel electrode by a first length. The first sub storage line overlaps a second edge portion of the pixel electrode opposite to the first edge portion by the first length. This arrangement prevents a misalignment of the pixel electrode from causing a variation in kickback voltage, thereby improving display image quality.

27 Claims, 10 Drawing Sheets

LCD PANEL ARRAY SUBSTRATES

RELATED APPLICATIONS

This application claims priority of Korean Patent Application No. 2006-60413, filed Jun. 30, 2006, the entire disclosure of which is incorporated herein by reference.

BACKGROUND

This disclosure relates to liquid crystal displays (LCDs), in general, and in particular, to array substrates for LCD panels that improve the image quality of display panels incorporating them.

LCDs typically include an LCD panel that displays an image using the optical characteristics of a liquid crystal material, and a backlight assembly disposed behind the panel for projecting light though the panel.

The LCD panel typically includes an array substrate, a color filter substrate facing the array substrate, and a layer of the liquid crystal material interposed between the two substrates.

The array substrate includes gate and data lines that are disposed substantially perpendicular to each other to define a plurality of rectangular unit pixels, along with thin film transistors that are electrically connected to the gate and data lines, pixel electrodes that are formed in the unit pixels and electrically connected to the thin film transistors, and storage lines that overlap the pixel electrodes. The storage lines are arranged to overlap the pixel electrodes so as to form storage capacitors that maintain the voltage applied to each pixel electrode during one image frame.

The elements of the array substrate are typically formed through a photolithography process. For example, the pixel electrodes may be formed through an entire-surface deposition, or by an exposure-by-mask and an etching process. Recently, as the size of array substrates has become large in comparison with that of the masks used to produce them, the exposure-by-mask process must be performed repetitively in order to expose a single substrate. That is, the mask must be moved by a predetermined distance between each of the multiple exposures of the substrate.

However, when the pixel electrodes are formed through such a multiple exposure process, the pixel electrodes may be slightly misaligned with respect to the gate lines, the data lines and the storage lines. When the pixel electrodes are misaligned with respect to the storage lines, the storage capacitors that are formed between the pixel electrodes and the storage lines can vary spatially, and as a result, generate varying kickback voltages that cause flicker defects that deteriorate the image quality of the display.

BRIEF SUMMARY

In accordance with the exemplary embodiments thereof described herein, LCD panel array substrates are provided that improve display image quality by preventing the storage capacitors of the substrates from being adversely changed due to misalignment of the pixel electrodes thereof.

In one exemplary embodiment, an LCD panel array substrate includes a gate line, a data line, a thin film transistor, a pixel electrode and a storage line. The gate line is formed in a first direction. The data line is formed in a second direction that crosses the first direction. The thin film transistor is electrically connected to the gate line and the data line. The pixel electrode is formed in a unit pixel area defined by the gate line and the data line and is electrically connected to the thin film transistor.

The storage line includes a main storage line, a first sub storage line and a second sub storage line. The main storage line is formed in the second direction. The first sub storage line is connected to the main storage line and extends in the first direction. The first sub storage line overlaps a first edge portion of the pixel electrode by a first length. The second sub storage line is connected to the main storage line and extends in the first direction. The first sub storage line overlaps a second edge portion of the pixel electrode opposite to the first edge portion thereof by the first length. For example, the first sub storage line may extend in the first direction by the first length, and the second sub storage line may extend in the first direction by a second length that is longer than the first length.

When the second sub storage line includes an overlapping storage electrode that overlaps the second edge portion of the pixel electrode by the first length, and a non-overlapping storage electrode that is connected to the overlapping storage electrode that does not overlap the second edge portion of the pixel electrode, the overlapping storage electrode may be offset, or curved from, the non-overlapping storage electrode and toward the pixel electrode, and in one alternative embodiment, a width of the overlapping storage electrode may be wider than a width of the non-overlapping storage electrode.

The pixel electrode may include a main pixel electrode that does not overlap the second sub storage line, and an overlapping electrode that extends from the main pixel electrode toward the second sub storage line so as to overlap the second sub storage line by the first length.

In another exemplary embodiment, an LCD display panel includes an array substrate, a counter substrate facing the array substrate, and a layer of a liquid crystal material disposed between the array substrate and the counter substrate.

The array substrate includes a gate line formed in a first direction, a data line formed in a second direction substantially perpendicular to the first direction, a thin film transistor electrically connected to the gate line and the data line, a pixel electrode that is formed in a unit pixel defined by the gate line and the data line to have a substantially rectangular shape and which is electrically connected to the thin film transistor, and a storage line comprising a main storage line formed in the second direction, a first sub storage line that is connected to the main storage line and that extends in the first direction, the first sub storage line overlapping a first edge portion of the pixel electrode by a first length, and a second sub storage line that is connected to the main storage line and that extends in the first direction, the first sub storage line overlapping a second edge portion of the pixel electrode opposite to the first edge portion by the first length.

In this exemplary embodiment, the length of the overlap between the first sub storage line and the first edge portion of the pixel electrode is substantially the same as the length of the overlap between the second sub storage line and the second edge portion of the pixel electrode so as to prevent the storage capacitor associated with the pixel electrode and storage line from varying due to a misalignment of the pixel electrode, thereby improving the image quality of the display panel.

A better understanding of the above and many other features and advantages of the novel LCD panel array substrates of the present invention may be obtained from a consideration of the detailed description of some exemplary embodiments thereof below, particularly if such consideration is made in conjunction with the appended drawings, wherein like reference numerals are used to identify like elements illustrated in one or more of the figures thereof.

DETAILED DESCRIPTION

Embodiment 1

Display Panel

Figure 1:
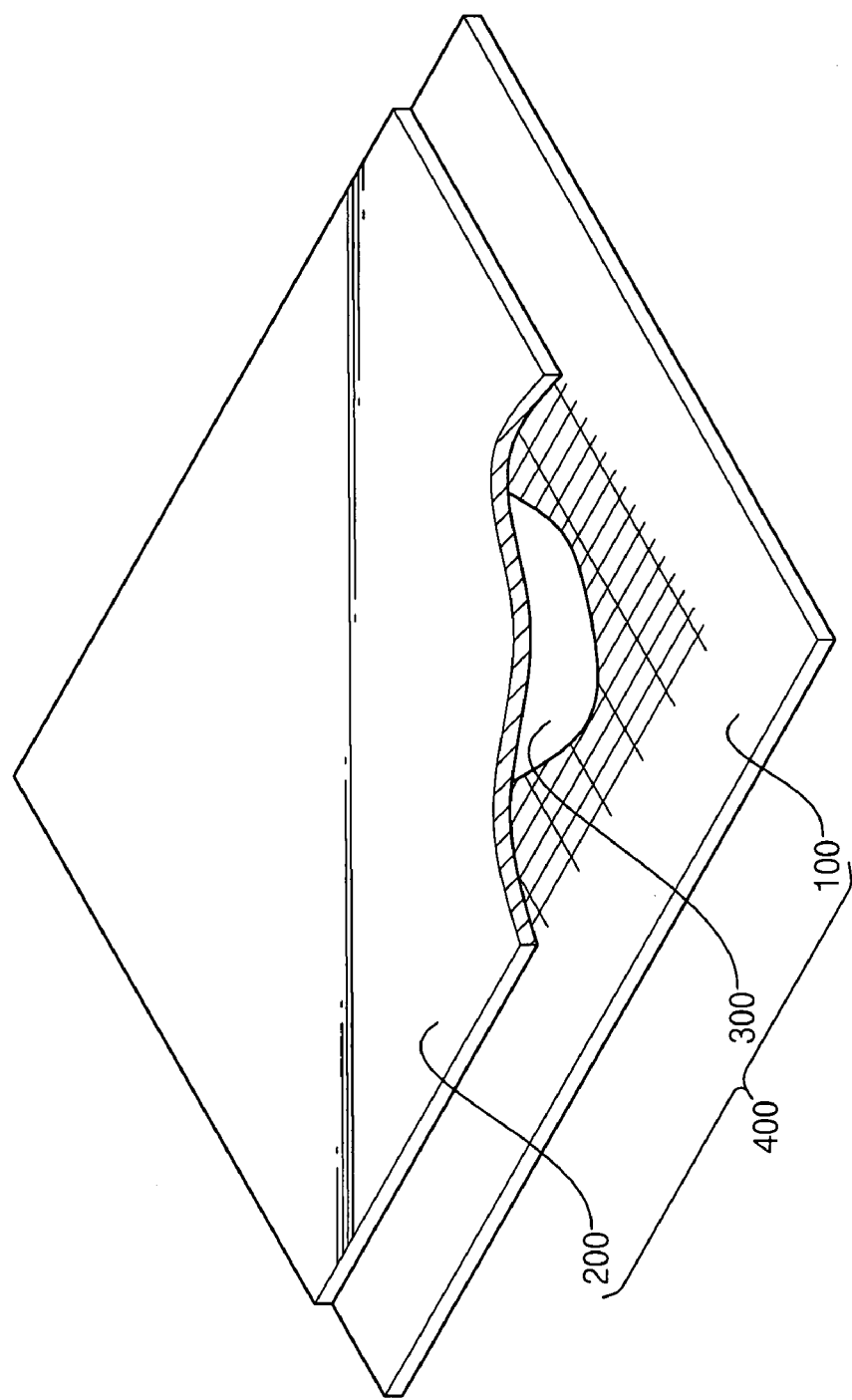
FIG. 1 is a cutaway perspective view of an exemplary embodiment of an LCD display panel in accordance with the present invention.

An exemplary embodiment of an LCD display panel 400 in accordance with the present invention is illustrated in the cutaway perspective view of FIG. 1. As illustrated in FIG. 1, the display panel 400 includes an array substrate 100, a counter substrate 200, and a layer of a liquid crystal material 300 interposed between the two substrates. As described above, the panel 400 is operable to display an image on the upper or front surface of the panel using light transmitted through the opposite lower or rear surface thereof.

The array substrate 100 includes a plurality of pixel electrodes arranged in a matrix form thereon, a plurality of thin film transistors that apply driving voltages to respective ones of the pixel electrodes, and a plurality of signal lines electrically connected to respective ones of the thin film transistors.

The counter substrate 200 is disposed in a spaced, facing opposition to the front side of the array substrate 100 and includes a transparent conductive common electrode and color filters that face the pixel electrodes. The color filters may include, for example, red, green, and blue (RGB) color filters.

The liquid crystal layer 300 is disposed between the array substrate 100 and the counter substrate 200, and is acted upon by an electric field generated between the pixel electrode and the common electrode such that the molecules of the liquid crystal layer 300 are thereby controllably rearranged. The rearranged molecules of the liquid crystal layer 300 adjust the optical transmissivity of light passing though the panel, and the light passes through the color filters so as to display images.

Figure 2:
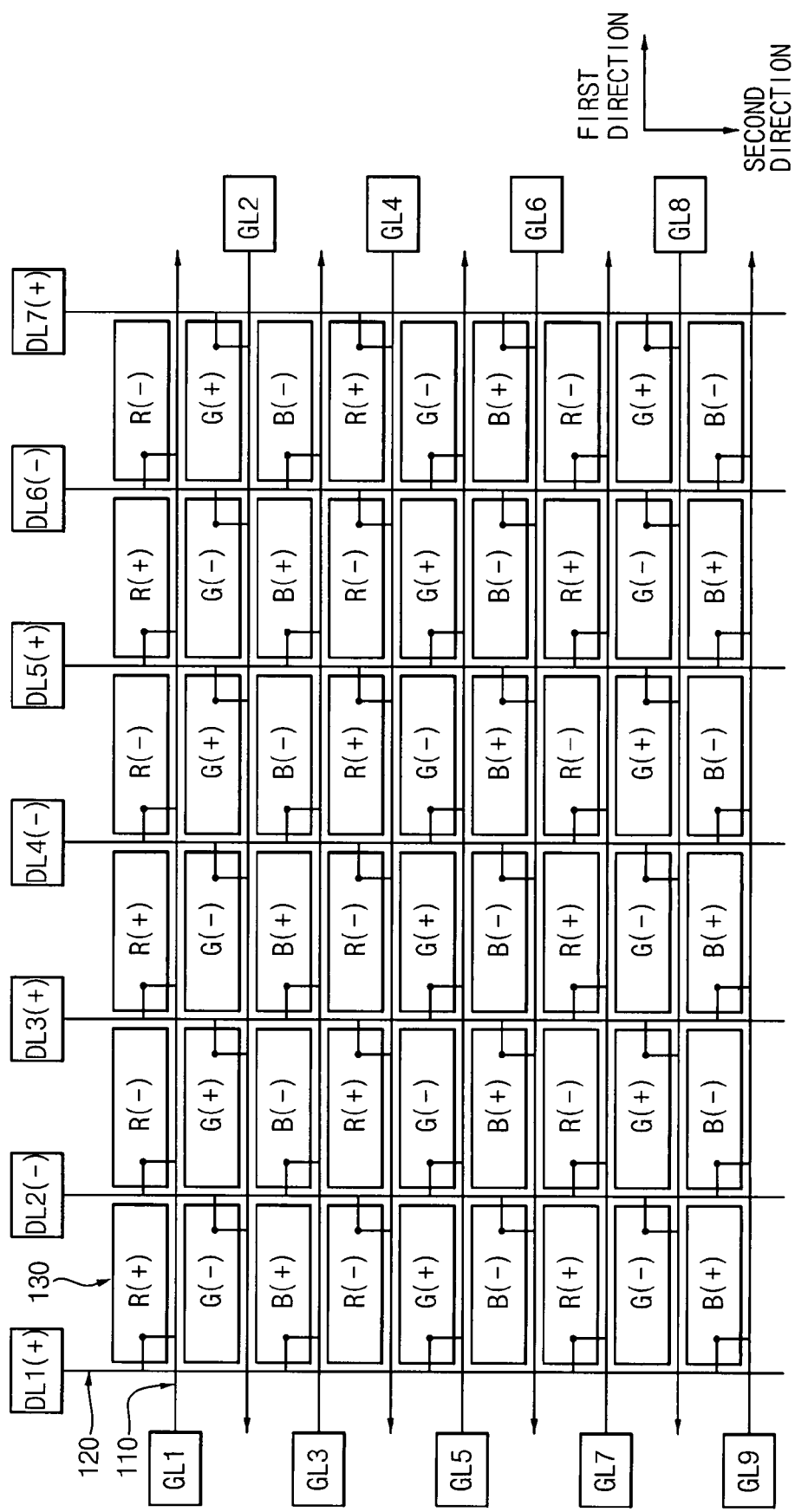
FIG. 2 is schematic partial plan view of a first exemplary embodiment of an array substrate of the exemplary display panel of FIG. 1.

FIG. 2 is schematic partial plan view of a first exemplary embodiment of an array substrate 100 of the exemplary LCD display panel of FIG. 1. As illustrated in FIG. 2, the exemplary array substrate 100 includes a plurality of gate lines 110, a plurality of data lines 120, and a plurality of pixel electrode 130. The gate lines 110 are formed to extend in a first direction, as indicated by the arrows in FIG. 2, and the data lines 120 are formed to extend in a second direction that is substantially perpendicular to the first direction, as indicated by the arrows. In the particular exemplary embodiment of FIG. 2, nine gate lines GL1-GL9 and seven data lines DL1-DL7 are shown for purposes of illustration, but these numbers can, of course, vary substantially.

The gate lines GL1-GL9 are electrically connected to a gate driving part (not illustrated) to receive gate signals, and the data lines DL1-DL7 are electrically connected to a data driving part (not illustrated) to receive data signals. The gate driving part includes a left gate driving part (not illustrated) that is electrically connected to a left end portion of the odd-numbered gate lines, GL1 . . . GL9, and a right gate driving part (not illustrated) that is electrically connected to a right end portion of even-numbered gate lines, GL2 . . . GL8. Alternatively, the gate driving part may comprise a single part electrically connected to an end portion of all of the gate lines GL1-GL9.

As discussed above, the gate lines GL1-GL9 are arranged substantially perpendicular to the data lines DL1-DL7 so as to define a rectangular array of unit pixels on the array substrate 100. Each pixel electrode 130 is formed in a respective one of the unit pixels, and thus, a plurality of pixel electrodes 130 is arranged in the form of a matrix on the array substrate 100.

In one exemplary embodiment, each unit pixel has a substantially rectangular shape, with a long side thereof extending in the first direction, and accordingly, the associated pixel electrode 130 formed therein likewise has a long side that extends in the first direction.

The gate lines GL1-GL9, the data lines DL1-DL7 and the pixel electrodes 130 are electrically interconnected in the following manner. Each of the gate lines GL1-GL9 is electrically connected to all of the pixel electrodes 130 in a corresponding one of the rows of pixels. In contrast, data line DL1 of the data lines DL1-DL7, which is disposed leftmost in FIG. 2, is electrically connected to the pixel electrodes 130 of the odd numbered rows of pixels in the first column of pixels, at the left side thereof, and data line DL7, which is disposed rightmost in FIG. 2, is electrically connected to the pixel electrodes 130 of the even numbered rows of pixels in the sixth column of pixels, at the right side thereof. Each of the remaining data lines DL2 . . . DL6 is electrically connected to the pixel electrodes 130 of the two pixel columns on either side thereof in an analogous manner, i.e., on the left side of the data lines, to pixel electrodes 130 in the even numbered pixel rows, and on the right side, to pixel electrodes 130 in the odd numbered pixel rows, as illustrated schematically in FIG. 2.

In one exemplary embodiment, data signals adapted to effect "vertical inversion" of the panel may be applied to the data lines DL1-DL7. Specifically, in one frame, a data signal having a positive voltage is applied to a selected data line, and a data signal having a negative voltage is applied to the data line adjacent to the selected data line. In the next frame, a data signal having a negative voltage is applied to the selected data line, and a data signal having a positive voltage is applied to the data line adjacent to the selected data line.

Figure 3:
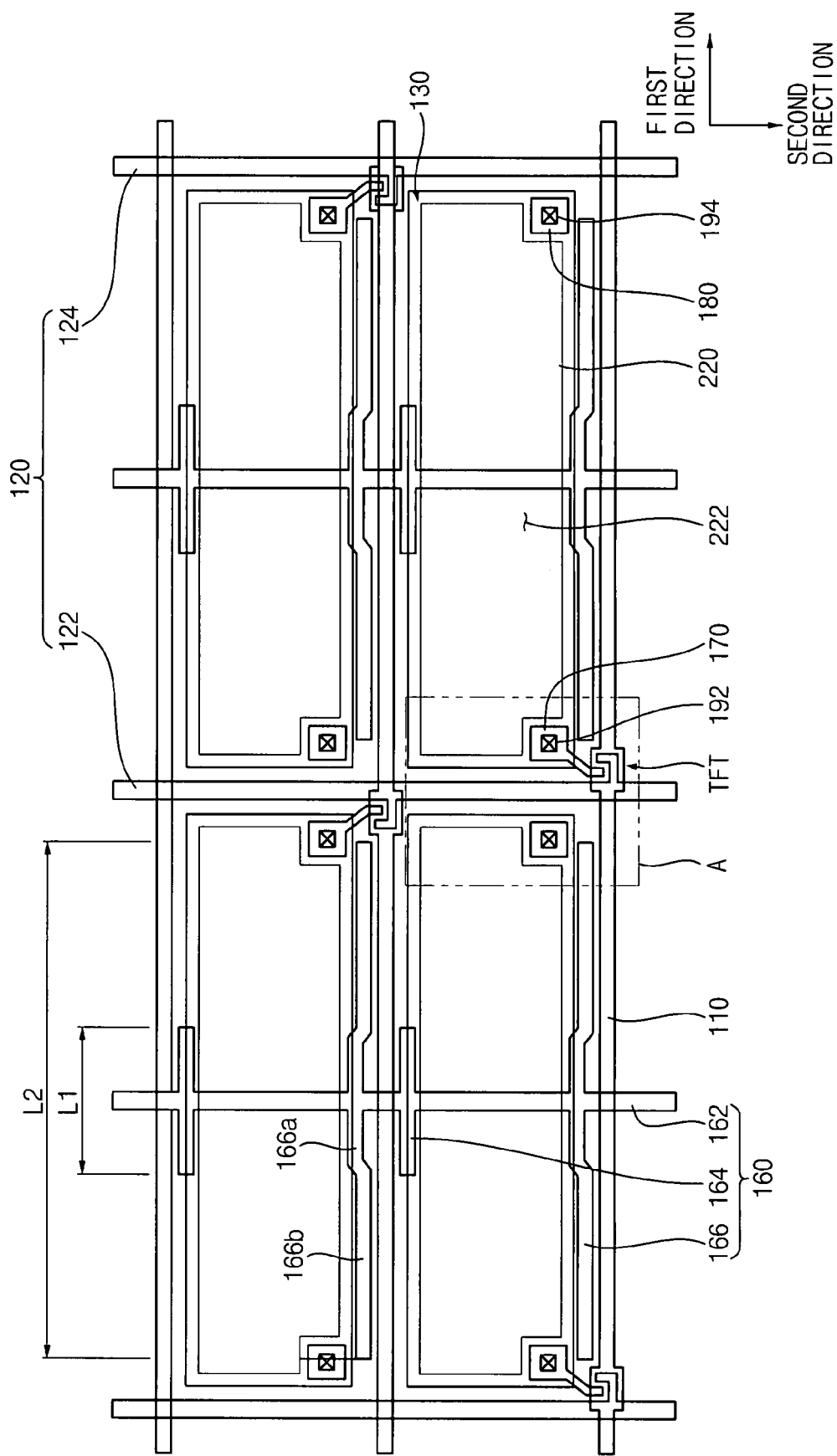
FIG. 3 is an enlarged partial plan view of a portion of the exemplary array substrate of FIG. 2.
Figure 4:
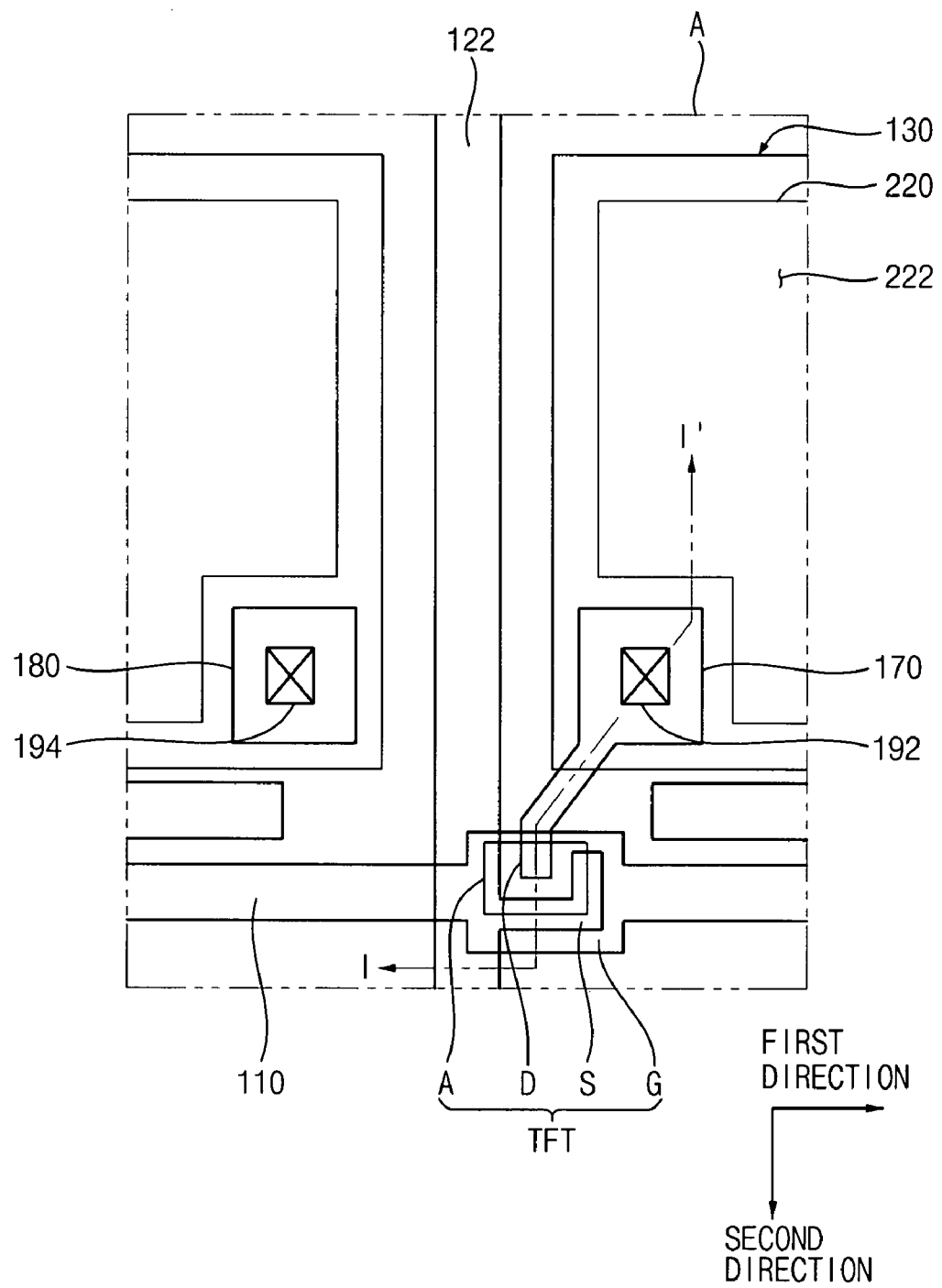
FIG. 4 is an enlarged plan view of the portion "A" of the array substrate outlined by phantom lines in FIG. 3.
Figure 5:
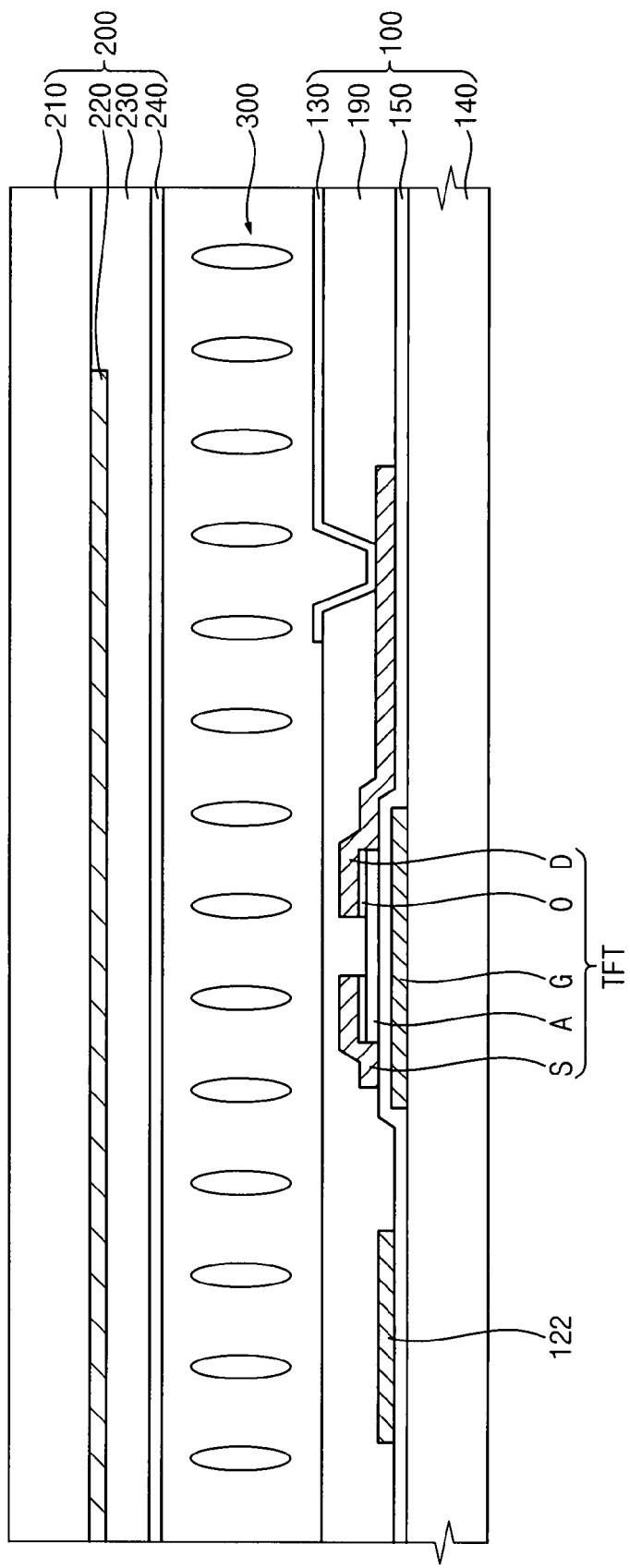
FIG. 5 is a partial cross-sectional view of the array substrate as seen along the lines of the section I-I' taken in FIG. 4.

FIG. 3 is an enlarged partial plan view of a portion of the exemplary array substrate 100 of FIG. 2, FIG. 4 is an enlarged plan view of the portion "A" of the array substrate outlined by phantom lines in FIG. 3, and FIG. 5 is a partial cross-sectional view of the array substrate as seen along the lines of the section I-I' taken in FIG. 4.

As illustrated in FIGS. 3-5, the exemplary array substrate 100 includes a first optically transparent substrate 140, a gate line 110, a gate insulation layer 150, a data line 120, a storage line 160, a thin film transistor TFT, a first connection electrode 170, a second connection electrode 180, a protective layer 190 and a pixel electrode 130.

The first transparent substrate 140 has, for example, a plate shape, and is comprised of an optically transparent material. The gate line 110 is formed on the first transparent substrate 140. The gate insulation layer 150 is formed on the first transparent substrate 140 so as to cover the gate line 130. The data line 120, the storage line 160, the first connection electrode 170 and the second connection electrode 180 are all formed on the gate insulation layer 150.

As illustrated in FIGS. 4 and 5, the thin film transistor TFT includes a gate electrode "G", a source electrode "S", a drain electrode "D", an active layer "A" and an ohmic contact layer "O". The gate electrode G corresponds to a part of the gate line 110, and the active layer A is formed on the gate insulation layer 150 to correspond to the gate electrode G. The source electrode S overlaps the active layer A, and extends, for example, from the data line 120 to have an L-shape. The drain electrode D is spaced apart from the source electrode S by a selected distance, and partially overlaps the active layer A. As illustrated in FIG. 5, the ohmic contact layer O is respectively formed between the active layer A and the source electrode S, and between the active layer A and the drain electrode D.

The protective layer 190 is formed on the gate insulation layer 190 so as to cover the data line 120, the storage line 160, the first connection electrode 170, the second connection electrode 180 and the thin film transistor TFT. First and second contact holes 192 and 194 are formed through the protective layer 190 at locations respectively corresponding to the first and second connection electrodes 170 and 180. The pixel electrode 130 is formed on the protective layer 190, and is electrically connected to the first and second connection electrodes 170 and 180 through the first and second contact holes 192 and 194, respectively. As illustrated in the plan view of FIG. 3, the pixel electrode 130 may have a substantially rectangular shape.

As further illustrated in the plan view of FIG. 3, the exemplary display panel 400 includes a plurality of gate lines 110 extending in the first direction and a plurality of orthogonal data lines 120 extending in the second direction. Each of the pixel electrodes 130 is formed in a respective one of the unit pixels, which are defined by adjacent pairs of the gate lines 110 and the data lines 120.

For each pixel electrode 130, the associated gate line 110 may be formed at either one of an upper portion and a lower portion of the pixel electrode 130, and as illustrated in FIG. 3, may be formed at the lower portion of the pixel electrode 130. A data line 120 is formed at the left side and the right side of the pixel electrode 130, with the left data line 122 being formed at the left side of the pixel electrode 130 and the right data line 124 being formed at the right side of the pixel electrode 130.

The first and second connection electrodes 170 and 180 are formed in each unit pixel. As illustrated in FIGS. 3 and 4, the first connection electrode 170 is formed rightward and apart from the left data line 122, and the second connection electrode 180 is formed leftward and apart from the right data line 124. The first and connection electrodes 170 and 180 are thus formed at opposite end portions of the unit pixels along the first direction thereof. The first and second connection electrodes 170 and 180 may be bilaterally symmetrical with respect to a virtual line passing through the center of each unit pixel and extending in the second direction.

A thin film transistor TFT is electrically connected to each of the first and second connection electrodes 170 and 180. In particular, a plurality of thin film transistors TFT is formed on the substrate. Each of the thin film transistors TFT corresponds to an associated one of the pixel electrodes 130, which are arranged in a matrix shape. Each of the thin film transistors TFT disposed in an odd-numbered row is electrically connected to the left data line 122 and the first connection electrode 170, and each of the thin film transistors TFT disposed in an even numbered row is electrically connected to the right data line 124 and the second connection electrode 180, as illustrated in FIG. 3. Optionally, the first and second connection electrodes 170 and 180 that are situated such that they are not electrically connected to a thin film transistor TFT can be omitted.

As illustrated in FIG. 3, each storage line 160 includes a main storage line 162, a first sub storage line 164 and a second sub storage line 166. The main storage line 162 extends in the second direction, and may pass through the center of each unit pixel in the column thereof.

The first sub storage line 164 is connected to the main storage line 162 and extends in the first direction. The first sub storage line 164 is arranged to overlap a first edge portion of an adjacent pixel electrode 130 by a first length L1. For example, the first sub storage line 164 may overlap an upper edge portion of a lower pixel electrode 130 by the first length L1.

In FIG. 3, the first sub storage line 164 extends in the first direction by the first length L1. Thus, the length of the overlap of the first sub storage line 164 and the pixel electrode 130 is substantially the same as the length of the first sub storage line 164. Alternatively, the length of the first sub storage line 164 may be greater than the length of the overlap of the first sub storage line 164 and the pixel electrode 130. In the particular exemplary embodiment of FIG. 3, the first sub storage line 164 extends bilaterally from the main storage line 162, i.e., away from opposite sides thereof, and has a length equal to the first length L1.

The second sub storage line 166 is connected to the main storage line 162 and also extends in the first direction. The second sub storage line 166 overlaps a second edge portion opposite to the first edge portion of the pixel electrode 130 by the first length L1. For example, the second sub storage line 166 is formed in each unit pixel to be opposite to the first sub storage line 164, and to overlap the pixel electrode 130 by substantially the same length as the overlap between the first sub storage line 164 and the pixel electrode 130.

In the exemplary embodiment of FIG. 3, the second sub storage line 166 extends in the first direction by a second length L2, which is longer than the first length L1. For example, the second sub storage line 166 has a length corresponding to the second edge portion of the pixel electrode 130. Thus, when a second sub storage line 166 formed between the pixel electrode 130 and the gate line 110 located below the pixel electrode 130 receives a reference voltage, it serves to prevent the gate signal on the gate line 110 from adversely affecting the driving voltage that is charged in the pixel electrode 130. As illustrated in FIG. 3, the second sub storage line 166 may extend bilaterally away from the main storage line 162, i.e., away from opposite sides thereof, and have a total length equal to the second length L2.

As further illustrated in FIG. 3, the second sub storage line 166 may include an overlapping storage electrode 166a that overlaps the second edge portion of the associated pixel electrode 130 by the first length L1, and a non-overlapping storage electrode 166b that is connected to the overlapping storage electrode 166a and that does not overlap the second edge portion of the associated pixel electrode 130. For example, as illustrated in FIG. 3, the second sub storage line 166 may have a shape such that the overlapping storage electrode 166a is curved away from the non-overlapping storage electrode 166b and toward the pixel electrode 130.

As illustrated in FIG. 5, the counter substrate 200 facing the array substrate 100 includes a second transparent substrate 210, a light-blocking layer 220, a plurality of color filters 230 and a common electrode 240. The second transparent substrate 210, for example, may be comprised of an optically transparent material and have a plate shape that is substantially the same as that of the first transparent substrate 140.

The light-blocking layer 220 is formed on the second transparent substrate 210 so as to face the array substrate 100. The light-blocking layer 220 may be formed on the second transparent substrate 210, for example, so as to cover the gate line 110, the data line 120, the thin film transistor TFT, the first connection electrode 170 and the second connection electrode 180.

The color filters 230 are formed on the second transparent substrate 210 so as to correspond to respective ones of the pixel electrodes 130. The color filters 230 may be formed so as to cover the light-blocking layer 220.

The common electrode 240 may be formed over substantially the entire surface of the color filters 230. The common electrode 240 may include a transparent conductive material that is substantially the same as the pixel electrode 130. Optionally, a planarizing layer (not illustrated) may be formed between the color filter 230 and the common electrode 240.

In the above exemplary embodiment, the length of the overlap between the first sub storage line 164 and the first edge portion of the pixel electrode 130 is substantially the same as the length of the overlap between the second sub storage line 166 and the second edge portion of the pixel electrode 130. Thus, although the pixel electrode 130 may be formed such that it is misaligned upwardly or downwardly with respect to the gate line 110, the area of the overlap between the storage line 160 and the pixel electrode 130 remains substantially constant, i.e., does not change. Therefore, the functional characteristics of the storage capacitor that is defined between the storage line 160 and the pixel electrode 130 also remain constant, even though the pixel electrode 130 may be slightly misaligned relative to the storage line 160.

Embodiment 2

Display Panel

Figure 6:
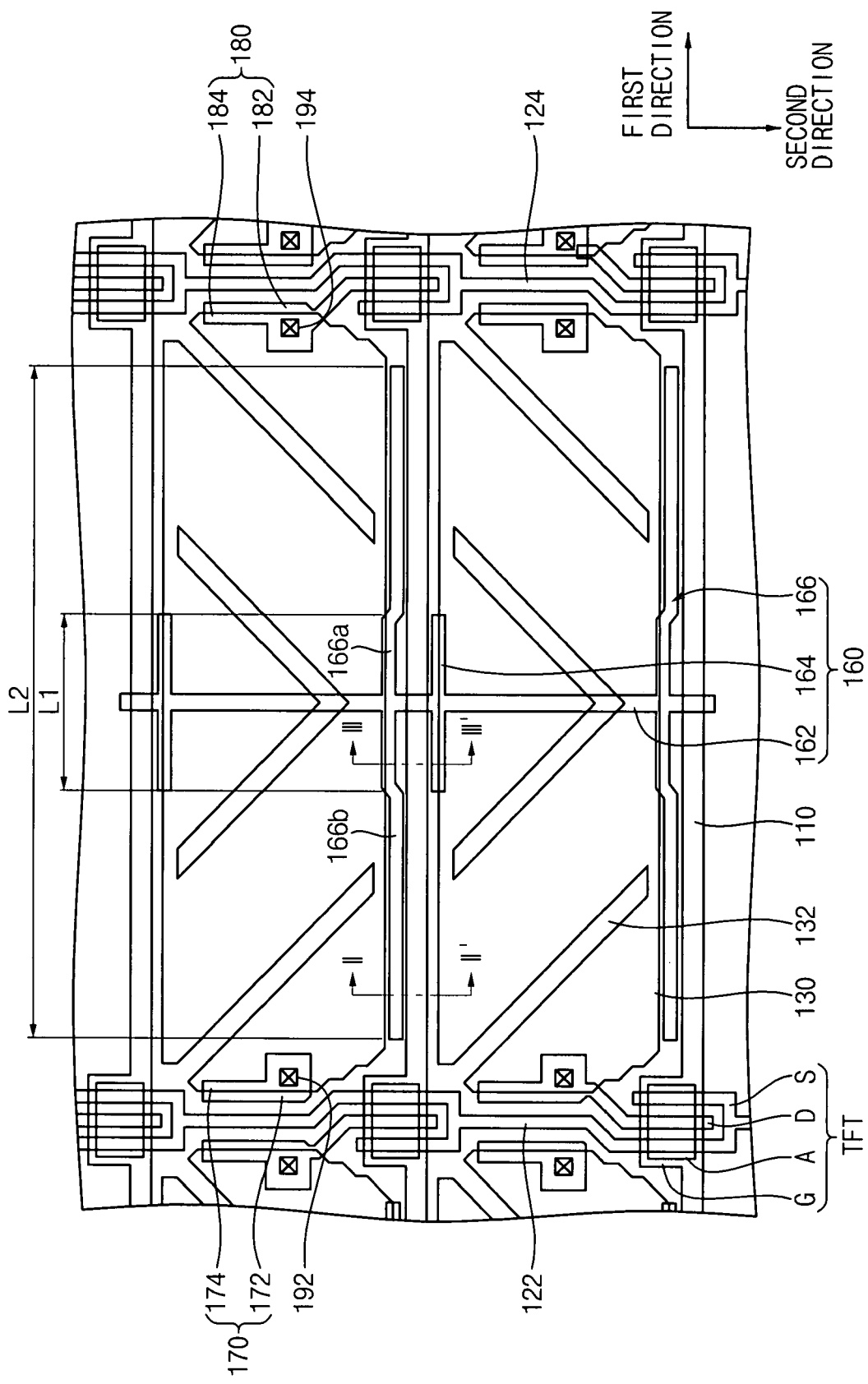
FIG. 6 is an enlarged partial plan view of a portion of a second exemplary embodiment of a display panel array substrate in accordance with the present invention.

FIG. 6 is an enlarged partial plan view of a portion of a second exemplary embodiment of a display panel array substrate 100 in accordance with the present invention. The second embodiment is substantially similar to the first exemplary embodiment described above, except for certain parts of the array substrate 100. Accordingly, the parts that are the same or substantially similar are represented by the same reference numerals and referred to by the same names, and further detailed description of these is omitted below for brevity.

Referring to FIGS. 2 and 6, the second exemplary array substrate 100 includes a gate line 110, a data line 120, a pixel electrode 130, a first connection electrode 170, a second connection electrode 180, a thin film transistor TFT and a storage line 160.

A plurality of gate lines 110 is formed on the substrate to extend in a first direction. A plurality of data lines 120 is formed to extend in a second direction substantially perpendicular to the first direction. The gate lines 110 and the data lines 120 cross each other to define a plurality of unit pixels, and each of a plurality of pixel electrodes 130 is formed in a respective one of the unit pixels. Each unit pixel may have, for example, a substantially rectangular shape, with long sides that extend in the first direction, as illustrated in FIG. 6.

As illustrated in FIG. 6, a domain-division portion 132 is formed in each pixel electrode 130 so as to divide each unit pixel into a plurality of domains. In FIG. 6, the domain-division portion 132 corresponds to an opening that is formed by partially removing the pixel electrode 130. Alternatively, the domain-division portion 132 may correspond to a protrusion that is formed on the pixel electrode 130.

A left data line 122 is formed at a left side of the pixel electrode 130, and a right data line 124 is formed at a right side of the pixel electrode 130. The left and right data lines 122 and 124 are alternately curved to the left and right sides in the second direction, and have, for example, a curvilinear, U-shaped form, as illustrated in FIG. 6.

The first and second connection electrodes 170 and 180 are formed in each unit pixel. The first connection electrode 170 is formed rightward and apart from the left data line 122, and is electrically connected to the associated pixel electrode 130 through a first contact hole 192. The second connection electrode 180 is formed leftward and apart from the right data line 124, and is electrically connected to the associated pixel electrode 130 through a second contact hole 194. The first and second connection electrodes 170 and 180 may be bilaterally symmetrical with respect to a virtual line passing through the center of the pixel electrode 130 and extending in the second direction.

More specifically, the first connection electrode 170 includes a first contact portion 172 that is electrically connected to the associated pixel electrode 130 through the first contact hole 192, and a first extension portion 174 that extends from the first contact portion 172 in the second direction. The second connection electrode 180 includes a second contact portion 182 that is electrically connected to the associated pixel electrode 130 through the second contact hole 194, and a second extension portion 184 that extends from the second contact portion 182 in the second direction.

The thin film transistor TFT includes a gate electrode G, an active layer A, a source electrode S, a drain electrode D and an ohmic contact layer (not illustrated). The gate electrode G corresponds to a part of the gate line 110, and the active layer A is formed over the gate electrode G. The source electrode S corresponds to a U-shaped curved portion of either the left data line 122 or the right data line 124 and partially overlaps the active layer A. The drain electrode D is formed between the source electrode S of the U-shape, and partially overlaps the active layer A. The ohmic contact layer (not illustrated) is respectively formed between the active layer A and the source electrode S, and between the active layer A and the drain electrode D.

A plurality of thin film transistors TFT is formed that correspond respectively to the pixel electrodes 130. Each drain electrode D of the thin film transistors TFT that are disposed in odd numbered rows and each drain electrode D of the thin film transistors TFT that are disposed in even numbered rows are formed on one virtual line that is substantially parallel with the second direction, and may be formed on the longitudinal line of the data line 120.

Each drain electrode D of the thin film transistors TFT is electrically connected to one of the first and second connection electrodes 170 and 180 that are formed in the same unit pixel. In particular, each of the thin film transistors TFT disposed in the odd numbered rows is electrically connected to the first connection electrode 170 disposed in the odd numbered rows, and each of the thin film transistors TFT disposed in the even numbered rows is electrically connected to the second connection electrode 180 disposed in the even numbered rows.

Figure 7:
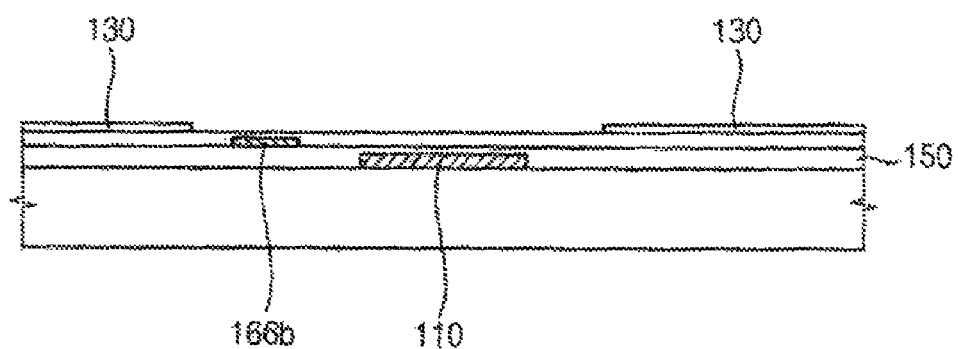
FIG. 7 is a cross-sectional view of the second exemplary array substrate as seen along the lines of the section II-II' taken in FIG. 6.
Figure 8:
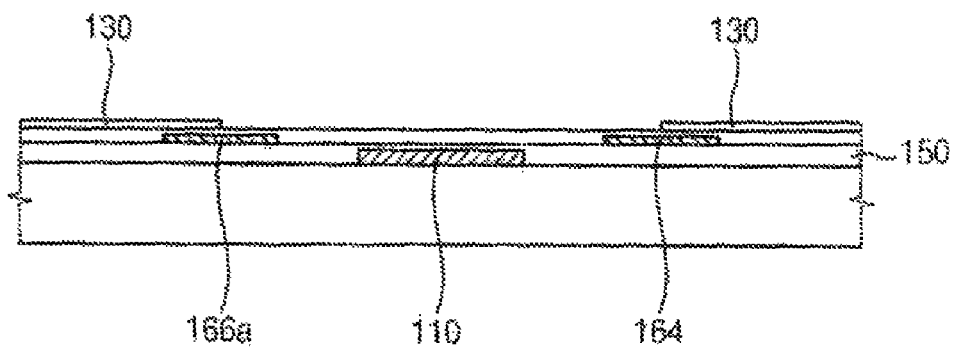
FIG. 8 is a cross-sectional view of the second exemplary array substrate as seen along the lines of the section III-III' taken in FIG. 6.

FIG. 7 is a cross-sectional view of the second exemplary array substrate as seen along the lines of the section II-II' taken in FIG. 6, and FIG. 8 is a cross-sectional view of the second exemplary array substrate as seen along the lines of the section III-III' taken in FIG. 6.

Referring to FIGS. 6, 7 and 8, the array substrate includes a storage line 160a to which reference voltage is externally applied, and the storage line 160 includes a main storage line 162, a first sub storage line 164 and a second sub storage line 166.

The main storage line 162 extends in the second direction, and may pass through the center of each of the unit pixels of a pixel column so as to overlap the pixel electrodes 130 thereof.

The first sub storage line 164 is connected to the main storage line 162 and extends in the first direction by a first length L1. The first sub storage line 164 overlaps a first edge portion of the pixel electrode 130 by the first length L1. Thus, the length of the overlap between the first sub storage line 164 and the pixel electrode 130 is substantially the same as the length of the first sub storage line 164. Alternatively, the length of the first sub storage line 164 may be greater than the length of the overlap of the first sub storage line 164 and the pixel electrode 130. As illustrated in FIG. 6, the first sub storage line 164 may extend out from opposite sides of the main storage line 162, and have an overall length equal to the first length L1.

The second sub storage line 166 is connected to the main storage line 162 and extends in the first direction by a second length L2 that is longer than the first length L1. For example, the second sub storage line 166 may have a length corresponding to a second edge portion of the pixel electrode 130. The second sub storage line 166 may extend away from opposite sides of the main storage line 162 and have a length equal to the second length L2, as illustrated in FIG. 6. The second sub storage line 166 overlaps the second edge portion of the pixel electrode 130 opposite to the first edge portion thereof by the first length L1. For example, the second sub storage line 166 may overlap the pixel electrode 130 by substantially the same length as the length of the overlap between the first sub storage line 164 and the pixel electrode 130.

More particularly, the second sub storage line 166 includes an overlapping storage electrode 166a that overlaps the second edge portion of the pixel electrode 130 and a non-overlapping storage electrode 166b that is connected to the overlapping storage electrode 166a and is arranged such that it does not overlap the second edge portion of the pixel electrode 130.

For example, the second sub storage line 166 may be shaped such that the overlapping storage electrode 166a curves away from the non-overlapping storage electrode 166b and toward the pixel electrode 130. The overlapping storage electrode 166a thus overlaps the second edge portion of the pixel electrode 130 by the first length L1. The non-overlapping storage electrode 166b is disposed between the pixel electrode 130 and the associated gate line 110 when viewed in a plan view.

The second sub storage line 166 may be bilaterally symmetrical with respect to a virtual line passing through the center of each unit pixel of a column thereof and extending in the second direction. The storage line 160 may also be bilaterally symmetrical with respect to that line.

In accordance with the second exemplary embodiment above, the length of the overlap between the first sub storage line 164 and the first edge portion of the pixel electrode 130 is substantially the same as the length of the overlap between the second sub storage line 166 and the second edge portion of the pixel electrode 130. Therefore, although the pixel electrode 130 may be misaligned either upwardly or downwardly with respect to the gate line 110, the area of overlap between the storage line 160 and the pixel electrode 130 will remain constant, i.e., unchanging, regardless of any such misalignment of the pixel electrode.

Embodiment 3

Display Panel

Figure 9:
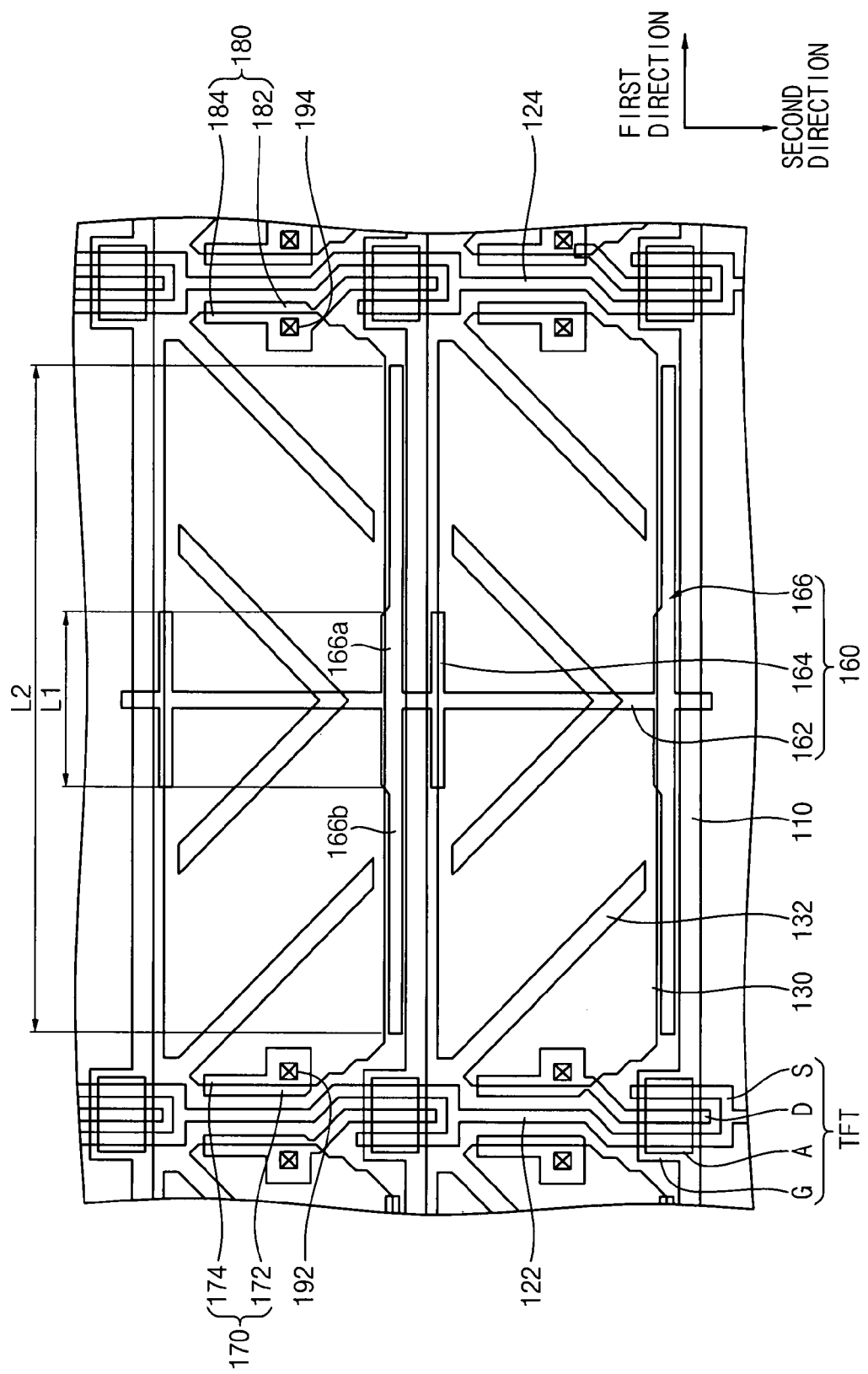
FIG. 9 is an enlarged partial plan view of a portion of a third exemplary embodiment of a display panel array substrate in accordance with the present invention.

FIG. 9 is an enlarged partial plan view of a portion of a third exemplary embodiment of a display panel array substrate in accordance with the present invention. The third exemplary array substrate is substantially similar to the second exemplary embodiment above, except for the storage lines thereof. Accordingly, in the description below, parts that are the same or substantially similar to those of the second embodiment are represented by the same reference numerals and referred to by the same names and further detailed description of these is omitted.

Referring to FIG. 9, the third exemplary array substrate includes a storage line 160a to which a reference voltage is externally applied, and the storage line 160 includes a main storage line 162, a first sub storage line 164 and a second sub storage line 166. The main storage line 162 extends in the second direction, and may pass through the center of each unit pixel in a pixel column so as to overlap the pixel electrodes 130 thereof.

The first sub storage line 164 is connected to the main storage line 162 and extends in the first direction by a first length L1. The first sub storage line 164 overlaps a first edge portion of the pixel electrode 130 by the first length L1. Thus, as illustrated in FIG. 9, the first sub storage line 164 may extend away from opposite sides of the main storage line 162 in the first direction and have a length equal to the first length L1.

The second sub storage line 166 is connected to the main storage line 162 and extends in the first direction by a second length L2 that is longer than the first length L1. For example, the second sub storage line 166 may have a length corresponding to a second edge portion of the pixel electrode 130 opposite to the first edge portion thereof. Thus, as illustrated in FIG. 9, the second sub storage line 166 may extend out from opposite sides of the main storage line 162 in the first direction and have a length that is equal to the second length L2.

As further illustrated in FIG. 9, the second sub storage line 166 overlaps the second edge portion of the pixel electrode 130 by the first length L1. For example, the second sub storage line 166 may overlap the pixel electrode 130 by substantially the same length as the length of overlap between the first sub storage line 164 and the first edge portion of the pixel electrode 130.

More particularly, the second sub storage line 166 includes an overlapping storage electrode 166a that overlaps the second edge portion of the pixel electrode 130 and a non-overlapping storage electrode 166b that is connected to the overlapping storage electrode 166a, and that does not overlap the second edge portion of the pixel electrode 130. As illustrated in FIG. 9, the non-overlapping storage electrode 166b is disposed between the pixel electrode 130 and the gate line 110 when viewed in a plan view.

The overlapping storage electrode 166a has a width that is wider than that of the non-overlapping storage electrode 166b. In one particular exemplary embodiment, the width of the non-overlapping storage electrode 166b is in a range of from about 3 μm to about 4 μm, whereas, the width of the overlapping storage electrode 166a is in a range of from about 5 μm to about 7 μm (where 1 μm=1×10$^{-6}$ meters). Since the width of the overlapping storage electrode 166a is greater than that of the non-overlapping storage electrode 166b, the overlapping storage electrode 166a overlaps the second edge portion of the pixel electrode 130 by the first length L1.

In an alternative embodiment (not illustrated), the storage line 160 may be shaped such that the overlapping storage electrode 166a curves away from the non-overlapping storage electrode 166b and toward the pixel electrode 130.

In the particular exemplary embodiment illustrated in FIG. 9, the second sub storage line 166 is bilaterally symmetrical with respect to a virtual line passing through the center of each unit pixel of the column thereof and extending in the second direction. The storage line 160 may also be bilaterally symmetrical with respect to that same line.

In accordance with the third exemplary embodiment described above, the overlapping storage electrode 166a has a width greater than that of the non-overlapping storage electrode 166b, and overlaps the second edge portion of the pixel electrode 130 by the first length L1. Thus, although the pixel electrode 130 may be slightly misaligned either upwardly or downwardly with respect to the gate line 110 during the fabrication thereof, the area of overlap between the storage line 160 and the pixel electrode 130 remains substantially constant, regardless of any such misalignment of the pixel electrode 130.

Embodiment 4

Display Panel

Figure 10:
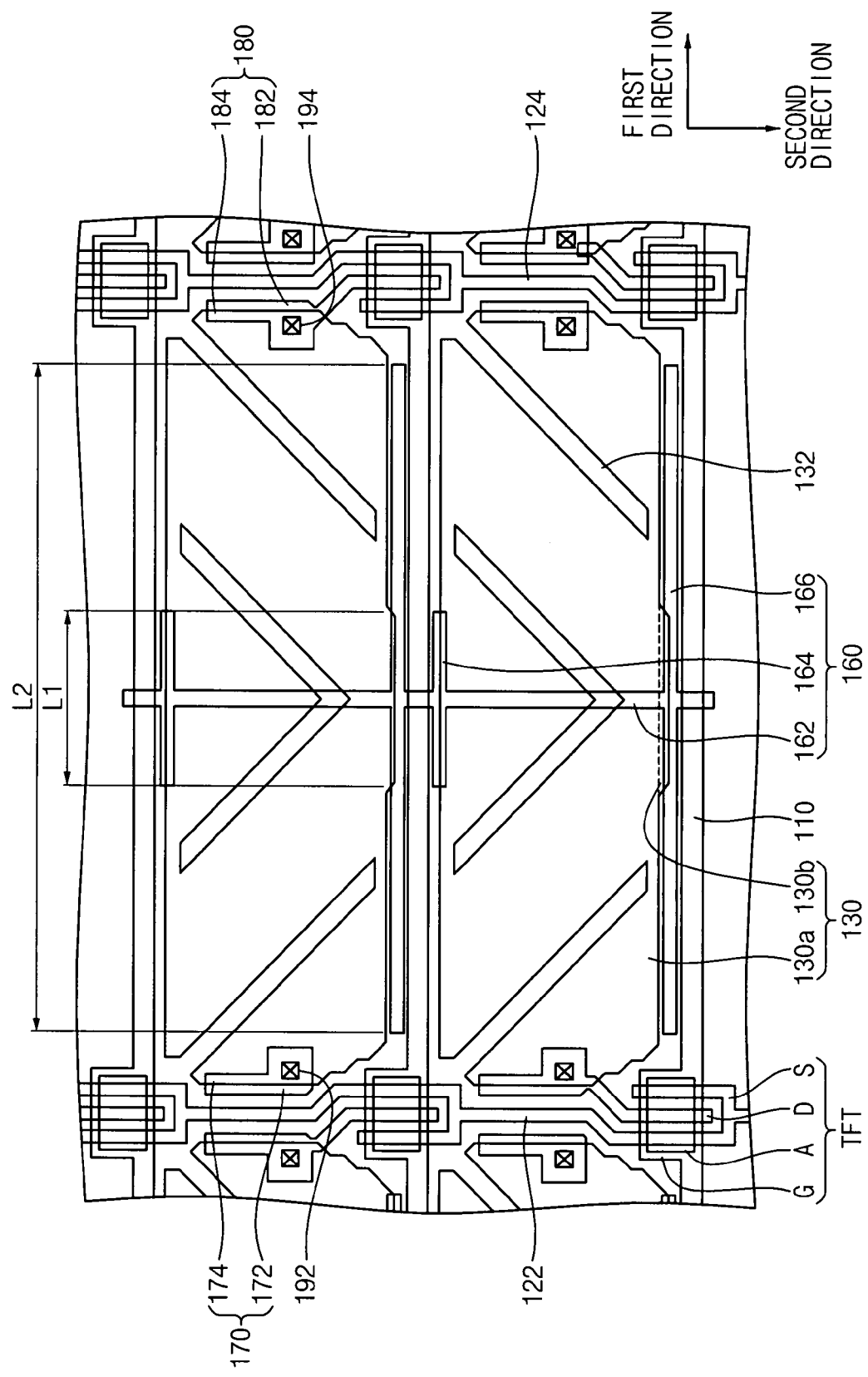
FIG. 10 is an enlarged partial plan view of a portion of a fourth exemplary embodiment of a display panel array substrate in accordance with the present invention; and, FIG. 11 is an enlarged partial plan view of a portion of a fifth exemplary embodiment of a display panel array substrate in accordance with the present invention.

FIG. 10 is an enlarged partial plan view of a portion of a fourth exemplary embodiment of a display panel array substrate in accordance with the present invention. The fourth exemplary array substrate is substantially similar to the second exemplary embodiment above, except for the storage lines and pixel electrodes thereof. Accordingly, in the description below, the parts that are the same or substantially similar to those of the second embodiment above are represented by the same reference numerals and are referred to by the same names and further detailed description thereof is omitted.

Referring to FIG. 10, the fourth exemplary embodiment includes a storage line 160 to which a reference voltage is externally applied, and the storage line 160 includes a main storage line 162, a first sub storage line 164 and a second sub storage line 166. The main storage line 162 extends in the second direction, and may pass through the center of each unit pixel of a pixel column to overlap the pixel electrodes 130 thereof.

The first sub storage line 164 is connected to the main storage line 162 and extends for a first length L1 in the first direction. The first sub storage line 164 is arranged to overlap a first edge portion of the pixel electrode 130 by the first length L1. As illustrated in FIG. 10, the first sub storage line 164 may extend outwardly from opposite sides of the main storage line 162 and have an overall length that is equal to the first length L1.

The second sub storage line 166 is connected to the main storage line 162 and extends in the first direction for a second length L2 that is longer than the first length L1. For example, the second sub storage line 166 has a length corresponding to the second edge portion of the pixel electrode 130. As illustrated in FIG. 10, the second sub storage line 166 may extend from opposite sides of the main storage line 162 and have an overall length that is equal to the second length L2.

As illustrated in FIG. 10, the second sub storage line 166 is arranged to overlap a second edge portion opposite to the first edge portion of the pixel electrode 130 by the first length L1. For example, the second sub storage line 166 may overlap the pixel electrode 130 by substantially the same length as the length of overlap between the first sub storage line 164 and the pixel electrode 130.

The second sub storage line 166 may be bilaterally symmetrical with respect to a virtual line passing through a center of each unit pixel and extending in the second direction. The storage line 160 may also be bilaterally symmetrical with respect to that same line.

Each of the pixel electrodes 130 is disposed in a respective one of the unit pixels, and includes a main pixel electrode 130a and an overlapping electrode 130b.

The main pixel electrode 130a corresponds to a larger portion of the pixel electrode 130 and is arranged such that it does not overlap the second sub storage line 166. The main pixel electrode 130a has, for example, a substantially rectangular shape, with a long side aligned in the first direction when viewed in plan view.

The overlapping electrode 130b extends down from the main pixel electrode 130a and toward the second sub storage line 166 so as to overlap the second sub storage line 166 by the first length L1.

A domain-division portion 132 is formed in each pixel electrode 130 so as to divide each unit pixel into a plurality of domains. In FIG. 10, the domain-division portion 132 corresponds to an opening that is formed by partially removing the pixel electrode 130, but in one possible alternative embodiment, the domain-division portion 132 may correspond to a protrusion formed on the pixel electrode 130.

In accordance with the fourth exemplary embodiment described above, the pixel electrode 130 includes an overlapping electrode 130b that overlaps the second sub storage line 166 by the first length L1. Thus, although the pixel electrode 130 may be misaligned either upwardly or downwardly with respect to the gate line 110 during its fabrication, the area of overlap between the storage line 160 and the pixel electrode 130 remains substantially constant, regardless of any such misalignment of the pixel electrode 130.

Embodiment 5

Display Panel

Figure 11:
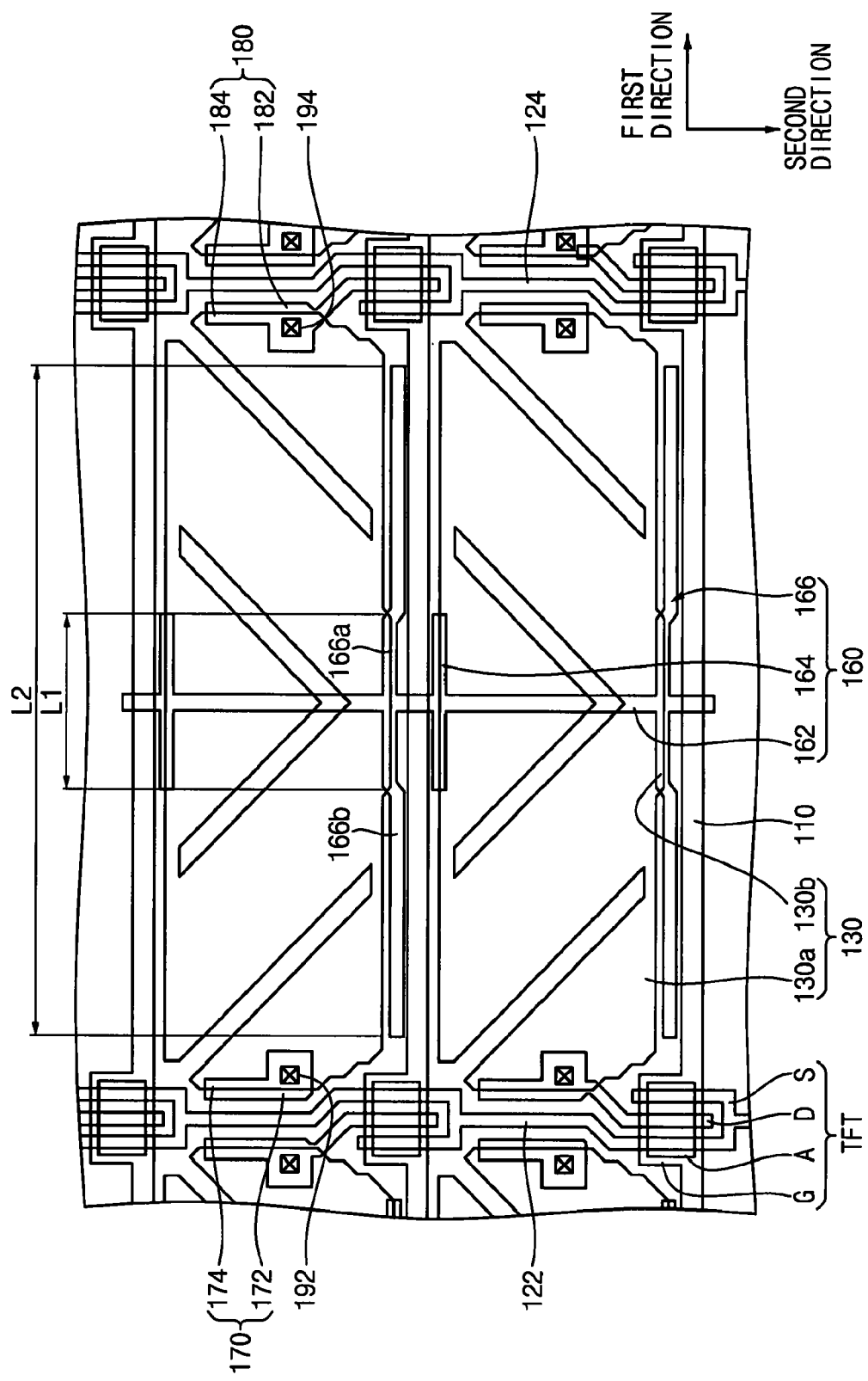

FIG. 11 is an enlarged partial plan view of a portion of a fifth exemplary embodiment of a display panel array substrate in accordance with the present invention. The fifth exemplary array substrate is substantially similar to the second exemplary embodiment above, except for the storage lines thereof. Accordingly, in the following description, parts that are the same or substantially similar to those of the second embodiment are represented by the same reference numerals and are referred to by the same names and further detailed description thereof is omitted.

Referring to FIG. 11, the fifth exemplary array substrate includes a storage line 160 to which a reference voltage is externally applied, and the storage line 160 includes a main storage line 162, a first sub storage line 164 and a second sub storage line 166. The main storage line 162 extends in the second direction, and may pass through the center of each unit pixel in a column thereof so as to overlap the pixel electrodes 130 thereof.

The first sub storage line 164 is connected to the main storage line 162 and extends in the first direction by a first length L1. The first sub storage line 164 is arranged to overlap a first edge portion of the pixel electrode 130 by the first length L1. As illustrated in FIG. 11, the first sub storage line 164 may extend out from opposite sides of the main storage line 162 and have an overall length equal to the first length L1.

The second sub storage line 166 is connected to the main storage line 162 and extends in the first direction by a second length L2 that is longer than the first length L1. For example, the second sub storage line 166 may have a length corresponding to a second edge portion of the pixel electrode 130 opposite to the first edge portion thereof. As illustrated in FIG. 11, the second sub storage line 166 may extend out from opposite sides of the main storage line 162 and have an overall length equal to the second length L2.

The second sub storage line 166 includes an overlapping storage electrode 166a that overlaps the second edge portion of the pixel electrode 130 by the first length L1 and a non-overlapping storage electrode 166b that is connected to the overlapping storage electrode 166a and that does not overlap the second edge portion of the pixel electrode 130. As illustrated in FIG. 11, the non-overlapping storage electrode 166b is disposed between the pixel electrode 130 and the associated gate line 110 when viewed in plan view.

As illustrated in FIG. 11, the overlapping storage electrode 166a has a shape that curves upward from the non-overlapping storage electrode 166b and toward the pixel electrode 130. The second sub storage line 166 may be bilaterally symmetrical with respect to a virtual line passing through a center of each unit pixel of a column thereof and extending in the second direction. The storage line 160 may also be bilaterally symmetrical with respect that same line.

Each pixel electrode 130 is disposed in a respective one of the unit pixels, and includes a main pixel electrode 130a and an overlapping electrode 130b.

The main pixel electrode 130a corresponds to a larger portion of the pixel electrode 130, and does not overlap the second sub storage line 166. The main pixel electrode 130a has, for example, a substantially rectangular shape with long sides that extend in the first direction when viewed in plan view.

The overlapping electrode 130b extends down from the main pixel electrode 130a and toward the second sub storage line 166 so as to overlap the second sub storage line 166 by the first length L1. For example, the overlapping electrode 130b may overlap the overlapping storage electrode 166a of the second sub storage line 166 by the first length L1.

A domain-division portion 132 is formed in each pixel electrode 130 so as to divide each unit pixel into a plurality of domains. In FIG. 11, the domain-division portion 132 corresponds to an opening that is formed by partially removing the pixel electrode 130, but in an alternative embodiment, the domain-division portion 132 may correspond to a protrusion formed on the pixel electrode 130.

In accordance with the fifth exemplary embodiment described above, the overlapping storage electrode 166a is curved toward the pixel electrode 130, and the pixel electrode 130 includes the overlapping electrode 130a that protrudes down toward the second sub storage line 166. Thus, although the pixel electrode 130 may be misaligned upwardly or downwardly with respect to the gate line 110 during fabrication thereof, the area of overlap between the storage line 160 and the pixel electrode 130, and hence, the storage capacitance defined thereby, remains constant, regardless of such misalignment of the pixel electrode 130.

According to the several exemplary embodiments disclosed herein, the length of overlap between the first sub storage line and the first edge portion of the pixel electrode is substantially the same as the length of overlap between the second sub storage line and the second edge portion of the pixel electrode. Thus, although the pixel electrode may be slightly misaligned either upwardly or downwardly with respect to the gate line during fabrication thereof, the storage capacitor defined by the area of overlap between the storage line and the pixel electrode remains substantially constant, regardless of such pixel electrode misalignment. Since the storage capacitor is substantially unaffected by pixel electrode misalignment, the kickback voltage provided by the storage capacitor remains substantially invariant, thereby improving the image quality of the display panel.

As those of skill in this art will by now appreciate, many modifications, substitutions and variations can be made in and to the materials, methods and configurations of the LCD panel array substrates of the present invention without departing from its spirit and scope. In light of this, the scope of the present invention should not be limited to that of the particular embodiments illustrated and described herein, as they are only by way of examples thereof, but instead, should be fully commensurate with that of the claims appended hereafter and their functional equivalents.

What is claimed is:

1. An array substrate, comprising:
    a gate line formed in a first direction;
    a data line formed in a second direction that crosses the first direction;
    a thin film transistor electrically connected to the gate line, the data line, and a pixel electrode; and
    a storage line, comprising:
    a first sub storage line that extends in the first direction, the first sub storage line overlapping a first edge portion of the pixel electrode by a first length; and,
    a second sub storage line that extends in the first direction, the second sub storage line overlapping a second edge portion of the pixel electrode opposite to the first edge portion thereof by the first length, wherein the storage line and the data line are formed in the same layer.

2. The array substrate of claim 1, wherein the main storage line passes through the center of the unit pixel.

3. The array substrate of claim 2, wherein the first and second sub storage lines extend out from opposite sides of the main storage line.

4. The array substrate of claim 3, wherein the storage line is bilaterally symmetrical with respect to a virtual line passing through the center of the unit pixel and extending in the second direction.

5. The array substrate of claim 1, wherein the second direction is substantially perpendicular to the first direction, and wherein the pixel electrode is formed in a unit pixel defined by the gate line and the data line and the unit pixel has a substantially rectangular shape, with a long side thereof disposed in the first direction.

6. The array substrate of claim 5, further comprising first and second connection electrodes formed in a same layer as the data line and at opposite end portions of the unit pixel so as to overlap the pixel electrode.

7. The array substrate of claim 6, further comprising:
a protective layer respectively disposed between the first connection electrode and the pixel electrode, and between the second connection electrode and the pixel electrode,
wherein a first contact hole is formed through the protective layer to electrically connect the first connection electrode to the pixel electrode, and a second contact hole is formed through the protective layer to electrically connect the second connection electrode to the pixel electrode.

8. The array substrate of claim 7, wherein a drain electrode of the thin film transistor is electrically connected to one of the first and the second connection electrodes.

9. The array substrate of claim 8, further comprising:
a plurality of pixel electrodes arranged in a matrix shape, a plurality of first and second connection electrodes corresponding to the pixel electrodes, and a plurality of thin film transistors corresponding to the pixel electrodes,
wherein drain electrodes of the thin film transistors disposed in odd numbered rows of the matrix are electrically connected to the first connection electrodes disposed in the odd numbered rows thereof, and drain electrodes of the thin film transistors disposed in even numbered rows of the matrix are electrically connected to the second connection electrodes disposed in the even numbered rows thereof.

10. The array substrate of claim 9, wherein the drain electrodes of the thin film transistors disposed in odd numbered rows of the matrix and the drain electrodes of the thin film transistors disposed in the even numbered rows of the matrix are formed on a longitudinal line of the data line.

11. The array substrate of claim 1, wherein the storage line further comprises a main storage line connecting the first sub storage and the second sub storage, wherein the main storage line is formed in the second direction.

12. The array substrate of claim 11, wherein the first sub storage line extends in the first direction by the first length, and the second sub storage line extends in the first direction by a second length that is longer than the first length.

13. The array substrate of claim 12, wherein the second sub storage line has a length corresponding to the second edge portion of the pixel electrode.

14. The array substrate of claim 11, wherein the second sub storage line comprises:
an overlapping storage electrode that overlaps the second edge portion of the pixel electrode by the first length; and,
a non-overlapping storage electrode that is connected to the overlapping storage electrode and that does not overlap the second edge portion of the pixel electrode.

15. The array substrate of claim 14, wherein the overlapping storage electrode is curved away from the non-overlapping storage electrode and toward the pixel electrode.

16. The array substrate of claim 14, wherein a width of the overlapping storage electrode is wider than a width of the non-overlapping storage electrode.

17. The array substrate of claim 16, wherein the width of the non-overlapping storage electrode is in a range of from about 3 µm to about 4 µm.

18. The array substrate of claim 16, wherein the width of the overlapping storage electrode is in a range of from about 5 µm to about 7 µm.

19. The array substrate of claim 11, wherein the pixel electrode comprises:
a main pixel electrode that does not overlap the second sub storage line; and,
an overlapping electrode that extends from the main pixel electrode and toward the second sub storage line so as to overlap the second sub storage line by the first length.

20. The array substrate of claim 19, wherein the second sub storage line comprises:
an overlapping storage electrode that overlaps the overlapping electrode by the first length; and,
a non-overlapping storage electrode that is connected to the overlapping storage electrode and that does not overlap the main pixel electrode.

21. The array substrate of claim 20, wherein the overlapping storage electrode is curved away from the non-overlapping storage electrode and toward the pixel electrode.

22. The array substrate of claim 21, wherein a width of the overlapping storage electrode is wider than a width of the non-overlapping storage electrode.

23. The array substrate of claim 1, wherein a distance between the second sub storage line and the gate line is smaller than a distance between the first sub storage line and the gate line, within the same pixel.

24. A display panel, comprising:
an array substrate comprising:
a gate line formed in a first direction;
a data line formed in a second direction substantially perpendicular to the first direction;
a thin film transistor electrically connected to the gate line and the data line;
a pixel electrode that is formed in a unit pixel defined by the gate line and the data line to have a substantially rectangular shape and that is electrically connected to the thin film transistor; and,
a storage line, comprising a main storage line formed in the second direction, a first sub storage line that is connected to the main storage line and that extends in the first direction, the first sub storage line overlapping a first edge portion of the pixel electrode by a first length, and a second sub storage line that is connected to the main storage line and that extends in the first direction, the second sub storage line overlapping a second edge portion opposite to the first edge portion of the pixel electrode by the first length;
a counter substrate facing the array substrate; and
a liquid crystal layer disposed between the array substrate and the counter substrate, wherein the storage line and the data line are formed in the same layer.

25. The display panel of claim 24, wherein the first sub storage line extends in the first direction for the first length, the second sub storage line extends in the first direction for a second length, and the second length is longer than the first length.

26. The display panel of claim 24, wherein the counter substrate comprises:
a light-blocking layer covering the first and second sub storage line;
a color filter covering the light-blocking layer; and
a common electrode formed on the color filter.

27. The display panel of claim 24, wherein a distance between the second sub storage line and the gate line is smaller than a distance between the first sub storage line and the gate line, within the same pixel.

* * * * *